United States Patent [19]
Onitsuka et al.

[11] Patent Number: 5,808,597
[45] Date of Patent: Sep. 15, 1998

[54] ILLUMINATION DEVICE FOR LIQUID CRYSTAL DISPLAY APPARATUS

[75] Inventors: Yoshihiro Onitsuka, Hiratsuka; Hiroshi Takabayashi, Atsugi; Toshiyuki Kanda, Chigasaki, all of Japan

[73] Assignee: Canon Kabushiki Kaisha, Tokyo, Japan

[21] Appl. No.: 610,416

[22] Filed: Mar. 4, 1996

[30] Foreign Application Priority Data

Mar. 8, 1995 [JP] Japan .................................. 7-048694

[51] Int. Cl.$^6$ ........................................ G09G 3/36
[52] U.S. Cl. ........................................ 345/102
[58] Field of Search ............................. 345/102; 349/61, 349/68, 70, 72; 362/31, 266; 315/290, 119, 225, 307

[56] References Cited

U.S. PATENT DOCUMENTS

| | | | |
|---|---|---|---|
| 4,958,915 | 9/1990 | Okada et al. | 350/345 |
| 5,019,751 | 5/1991 | Flory, IV et al. | 315/290 |
| 5,023,516 | 6/1991 | Ito et al. | 315/101 |
| 5,041,821 | 8/1991 | Onitsuka et al. | 340/784 |
| 5,046,826 | 9/1991 | Iwamato et al. | 359/49 |
| 5,058,994 | 10/1991 | Mihara et al. | 359/56 |
| 5,065,357 | 11/1991 | Shiraishi et al. | 345/102 |
| 5,078,476 | 1/1992 | Skin | 345/102 |
| 5,150,231 | 9/1992 | Iwamoto et al. | 359/44 |
| 5,182,549 | 1/1993 | Taniguchi et al. | 340/784 |
| 5,202,950 | 4/1993 | Arego et al. | 385/146 |
| 5,211,463 | 5/1993 | Kalmanash | 362/26 |
| 5,296,783 | 3/1994 | Fischer | 315/64 |
| 5,313,225 | 5/1994 | Miyadera | 345/102 |
| 5,438,484 | 8/1995 | Kanda et al. | 362/31 |
| 5,488,388 | 1/1996 | Taniguchi et al. | 345/97 |
| 5,506,601 | 4/1996 | Mihara et al. | 345/103 |
| 5,525,870 | 6/1996 | Matsuzawa et al. | 315/307 |

FOREIGN PATENT DOCUMENTS

| | | |
|---|---|---|
| 0576991 | 1/1994 | European Pat. Off. . |
| 0608061 | 7/1994 | European Pat. Off. . |
| 405002159 | 1/1993 | Japan ......... 345/102 |
| 406180441 | 6/1994 | Japan ......... 345/102 |

OTHER PUBLICATIONS

Patent Abstracts of Japan, vol. 095, No. 003, 28 Apr. 1995 & JP 06 333682 A (Ricoh Co Ltd), 2 Dec. 1994, *abstract*.
Patent Abstracts of Japan, vol. 017, No. 526 (P–1617), 21 Sep. 1993 & JP 05 142539 A (Matsushita Electric Works Ltd), 11 Jun. 1993, *abstract*.
Patent Abstracts of Japan, vol. 018, No. 540 (E–1616), 14 Oct. 1994 & JP 06 196290 A (Ushio Inc), 15 Jul. 1994, *abstract*.

Primary Examiner—Jeffery Brier
Assistant Examiner—Paul A. Bell
Attorney, Agent, or Firm—Fitzpatrick, Cella, Harper & Scinto

[57] ABSTRACT

An illumination device for a liquid crystal display apparatus to be disposed on a back side of a liquid crystal display panel is constituted by a plurality of illumination circuits, and plural hot cathode tubes including at least one hot cathode tube associated with each illumination circuit. Each illumination circuit includes a life detection circuit for detecting an end of life of a hot cathode tube, and a turn-off circuit for turning off the hot cathode tube depending on an output of the life detection circuit. Each illumination circuit controls said at least one hot cathode tube associated therewith independently from the other hot cathode tubes. As a result, even when a hot cathode tube approaches its end of life, the illumination device can be partially turned off to allow an operator to continue the operation on the liquid crystal display apparatus.

19 Claims, 7 Drawing Sheets

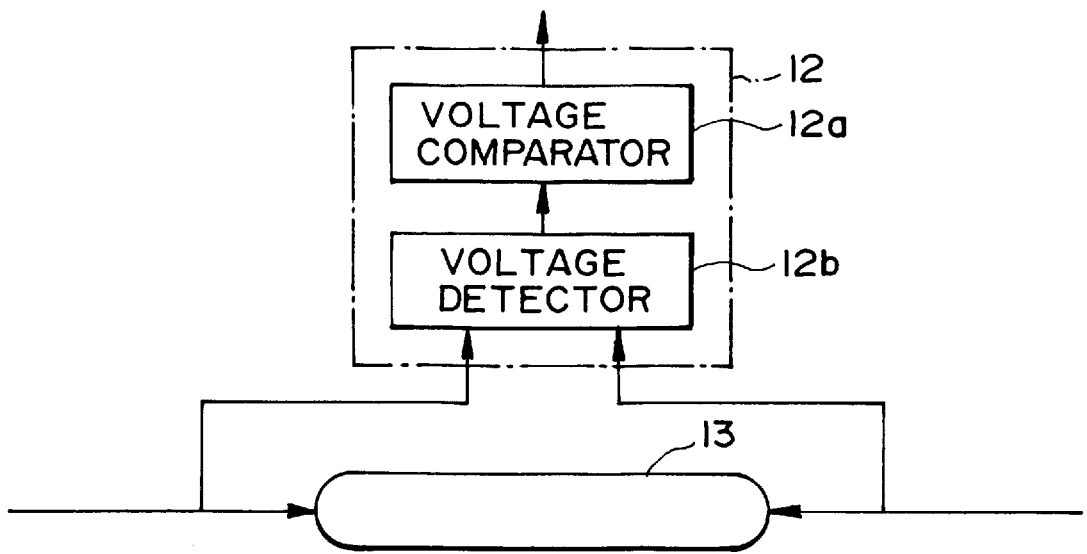
F I G. 2A
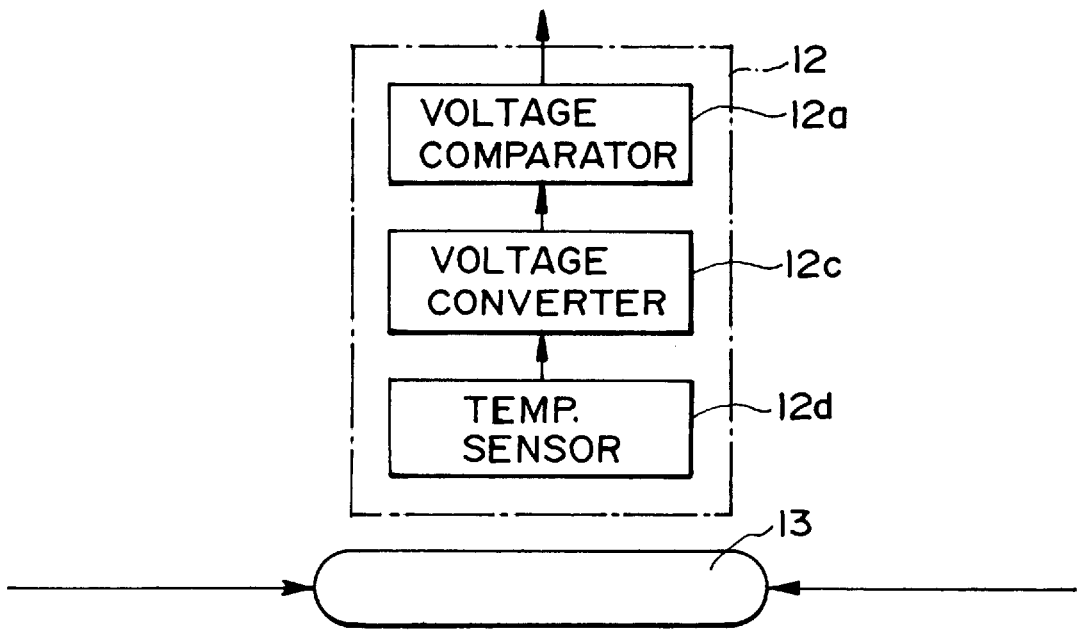
F I G. 2B

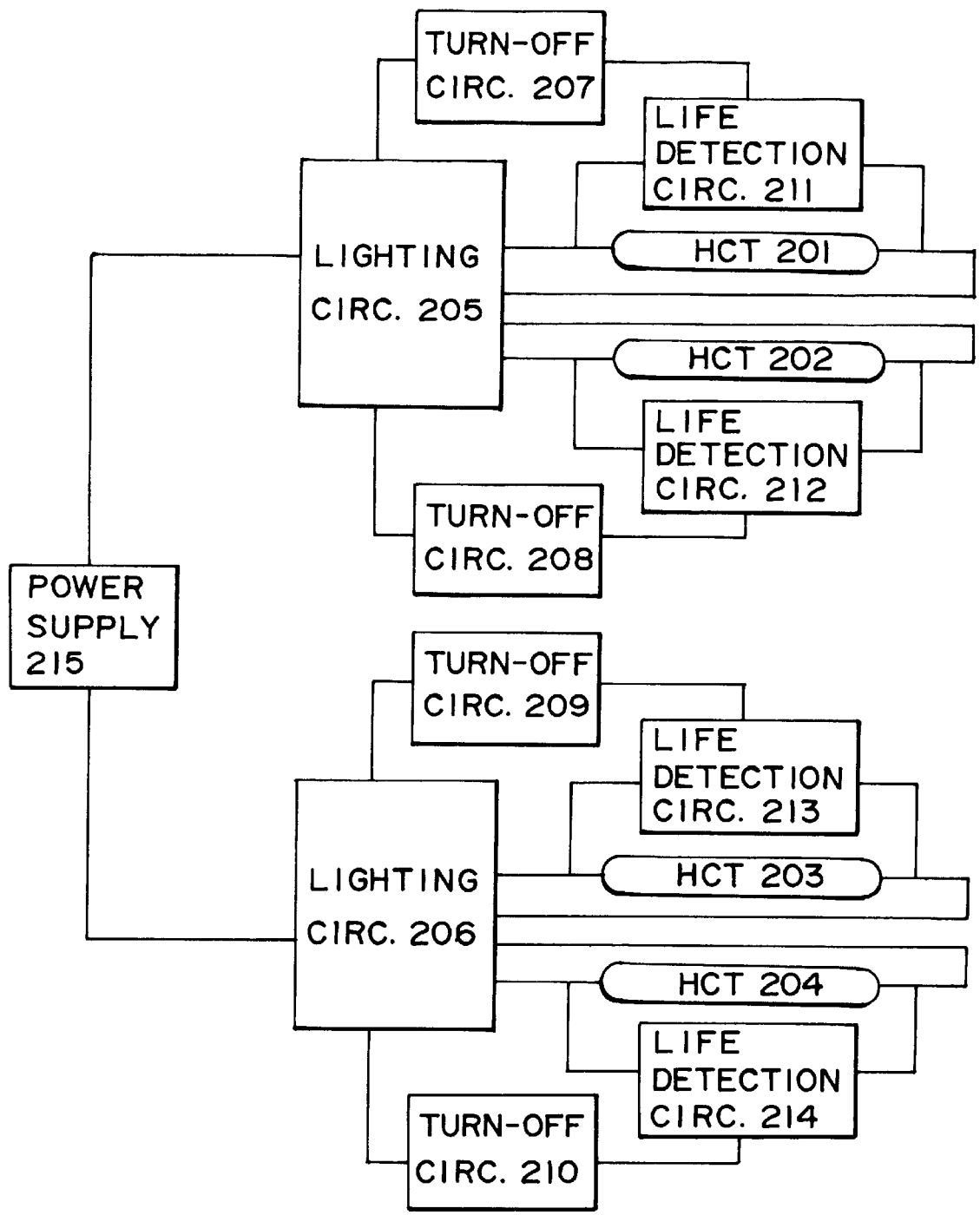
F I G. 4

ILLUMINATION DEVICE FOR LIQUID CRYSTAL DISPLAY APPARATUS

FIELD OF THE INVENTION AND RELATED ART

The present invention relates to an illumination device including plural hot cathode tubes suitable for use in a liquid crystal display apparatus, and a liquid crystal display apparatus including the illumination device.

A liquid crystal display apparatus generally includes a display panel comprising a pair of substrates and a nematic liquid crystal or a smectic liquid crystal disposed between the substrates. Particularly, if a chiral nematic liquid crystal or a chiral smectic liquid crystal is used so as to have the pixels retain a display state (liquid crystal molecular orientation state) for at least one frame scanning period, it is relatively easy to prepare a display panel having a large-area of 15 inches or larger in diagonal size.

In view of the increased in display area size, an illumination device therefor, generally called a backlight, is required to include a plurality of lamps as a light source. For this purpose, an illumination device for a liquid crystal display apparatus has been developed as described below.

When an illumination device is prepared by using a hot cathode tube, the hot cathode tube finally causes breakage of the filament at the end of its life. As a result, a terminal portion close to the electrode of the tube is abnormally heated making it more liable to cause deformation of adjacent other members. Accordingly, it is necessary to take safety precautions against the end of a tube life. For this purpose, it has been the practice to detect an increase in lighting voltage of a tube near the end of its life, or dispose a thermal fuse or a thermistor in proximity to a tube electrode so as to detect a temperature that indicates abnormal heating. Then, if the end of its tubes life is detected, the operation of an inverter is terminated to turn off all the tubes in the illumination device.

However, when a life end detection control as described above for hot cathode tubes for an illumination device including termination of the inverter to turn off all the tubes by a failure of one tube is utilized, an operator of a liquid crystal display apparatus equipped with the illumination device cannot continue its operation because the display suddenly becomes to dark.

SUMMARY OF THE INVENTION

An object of the present invention is to provide an illumination device for a liquid crystal display apparatus including a plurality of light sources such that, when one light source approaches its end of life, only the light source or a block of light sources including the light source is turned off without turning off all the light sources constituting the illumination device.

According to the present invention, there is provided an illumination device for a liquid crystal display apparatus to be disposed on a back side of a liquid crystal display panel, comprising: a plurality of illumination circuits, and plural hot cathode tubes including at least one hot cathode tube associated with each illumination circuit, each illumination circuit including a life detection circuit for detecting an end of life of a hot cathode tube, and a turn-off circuit for turning off the hot cathode tube depending on an output of the life detection circuit, each illumination circuit controlling said at least one hot cathode tube associated therewith independently from the other hot cathode tubes.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 2A and 2B are respectively a system diagram of a life detection circuit used in the invention.

FIGS. 3 and 4 are circuit block diagrams of illumination devices of First embodiment and Second embodiment, respectively, according to the invention.

DESCRIPTION OF THE PREFERRED EMBODIMENTS

Figure 1:
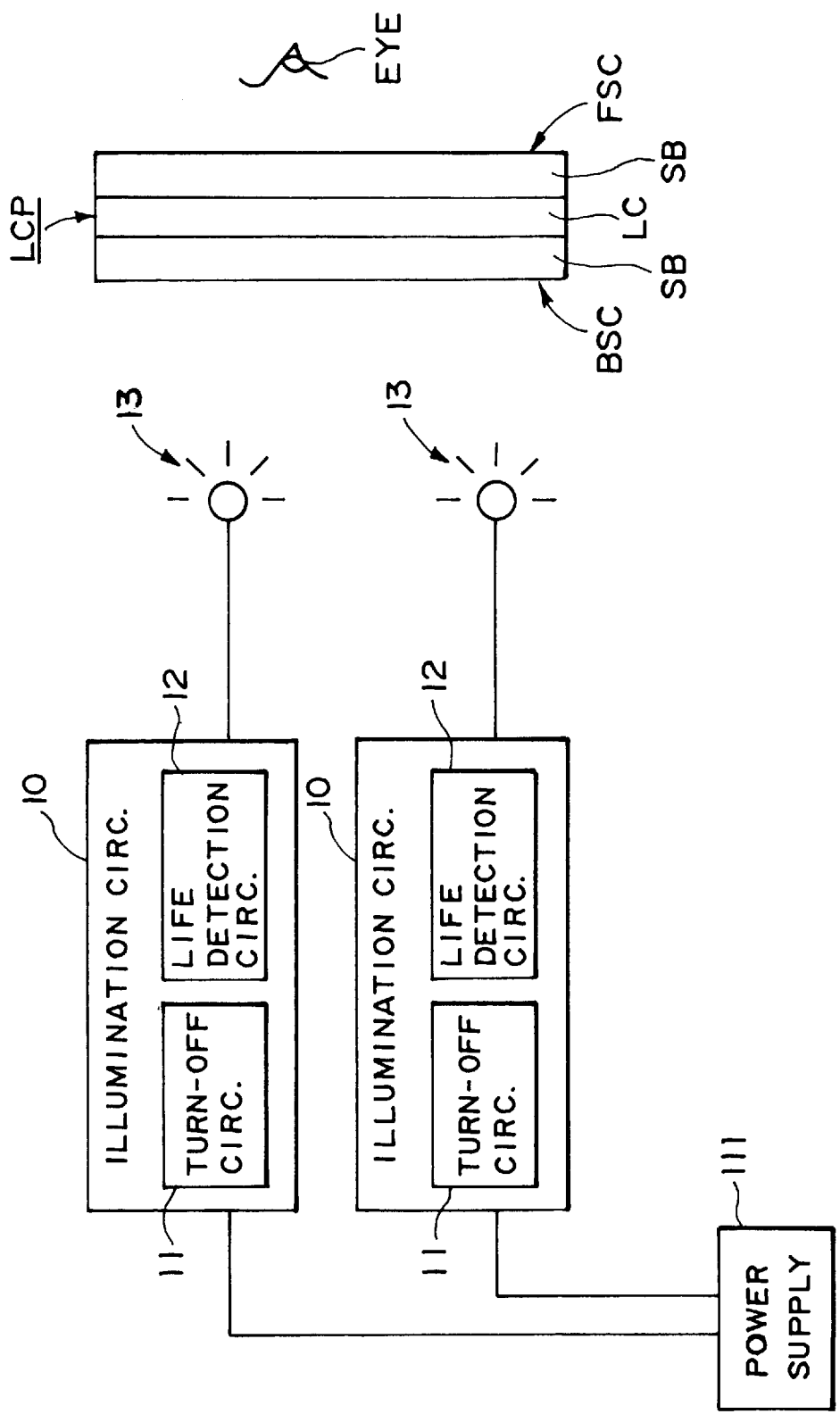
FIG. 1 is a system diagram of a liquid crystal display apparatus including an illumination device according to an embodiment of the invention.

FIG. 1 is a system diagram of a liquid crystal display apparatus including an illumination device according to a preferred embodiment of the present invention.

Plural light sources 13 are respectively controlled by independent two illumination circuits 10. Each illumination circuit 10 includes a life detection circuit 12 for detecting a life end of an associated light source 13 and a turn-off circuit 11 for turning off the light source 13 depending on an output signal from the life detection circuit 12. Each circuit 10 turns on the light source 13 with a supply voltage supplied from a common power supply 111.

The two light sources 13 are both disposed on a back side (BSC side) of a liquid crystal display panel LCP including a pair of substrates SB and a liquid crystal LC disposed therebetween. An operator or user of the liquid crystal display apparatus can recognize a display image from a front side (FSC side) of the panel LCP.

The life detection circuit 12 of each illumination circuit 10 may be constituted in a manner as shown in FIG. 2A or 2B.

FIG. 2A shows a system wherein a lighting voltage applied to a hot cathode tube 13 acting as a light source is detected by a voltage detection circuit 12$b$, and the detected signal voltage is compared with a reference voltage indicating a life end of a hot cathode tube by a voltage comparison circuit 12$a$. If the detected signal voltage is higher than the reference voltage, the voltage comparison circuit 12$a$ issues a high-level signal or a low-level signal. The turn-off circuit 11 receiving the signal stops a voltage supply to the light source 13 to turn off the light source 13.

The voltage detection circuit 12, may for example, comprise a detection circuit comprising an appropriate combination of a rectifying element, such as a diode, and a low-pass filter, such as a capacitor.

The life detection circuit 12 may also be composed by using a temperature sensor 12$d$ for detecting the temperature of the light source 13 and a voltage converter 12$c$ as shown in FIG. 2B.

The temperature sensor 12$d$ may, for example, comprise a thermistor having a resistance varying depending on the temperature, and the voltage converter 12c may comprise a circuit for supplying a current to the thermistor to cause a temperature-dependent voltage decrease.

The thus-detected voltage is compared with a reference voltage by a voltage comparison circuit 12a, which may be similar to the one used in the system of FIG. 2A. The system shown in FIG. 2B is effective in the case where a light source having a correlation between its life and its evolution heat is used.

The liquid crystal display panel LCP may comprise a pair of transparent substrates SB of, e.g., glass, quartz or plastic having electrodes thereon and a liquid crystal LC disposed between the substrates SB. The liquid crystal LC may suitably comprise a chiral smectic liquid crystal showing a chiral smectic phase or a chiral nematic liquid crystal showing a chiral nematic phase. A device using the former liquid crystal is known as a ferroelectric liquid crystal device or an anti-ferroelectric liquid crystal device, and a device using the latter liquid crystal is known as a bistable twisted-nematic (BTN) liquid crystal device, which can retain a display state of respective pixels for a period of at least one frame scanning period.

The light sources used in the present invention may suitably comprise hot cathode tubes. A preferred example of hot cathode tube may be a fluorescent lamp capable of issuing white light having a broad spectral characteristic over a broad wavelength range of red, green and blue. The hot cathode tube may more preferably comprise a three wavelength fluorescent lamp issuing white light having emission peaks each having a narrow half-value width in three wavelength regions of red, green and blue, respectively.

The fluorescent lamps (hot cathode tubes) may be disposed in a number of totally 4 or totally 2 along four sides or opposite two sides of a rectangular light guide member, such as an acrylic resin plate, so as to form an edge light-type illumination device (backlight device), or in an appropriate plurality in parallel with each other behind a display panel so as to form a direct-backing type illumination device.

[First embodiment]

Figure 3:
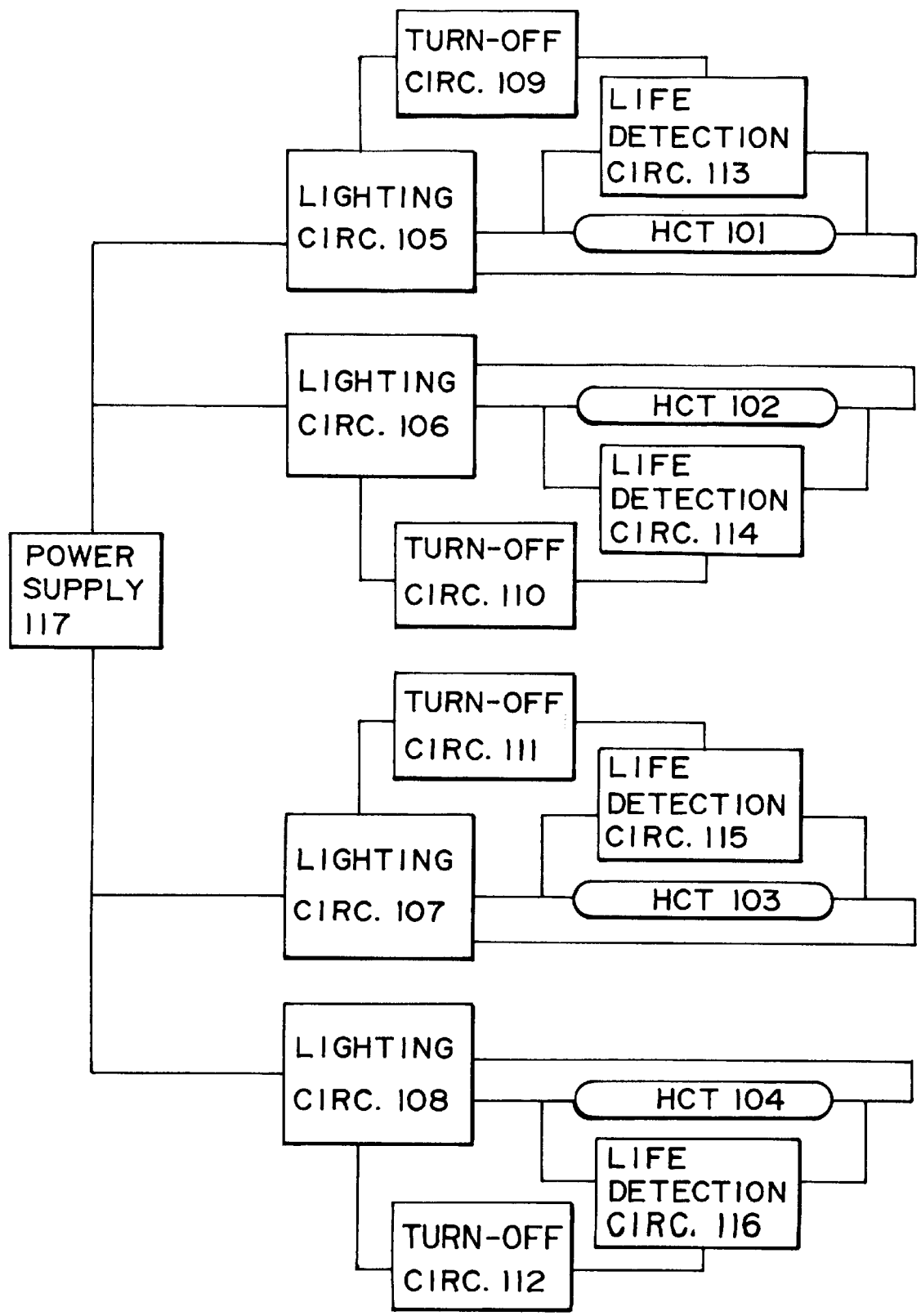

FIG. 3 is a circuit block diagram of an illumination device according to First embodiment of the present invention. The illumination device includes four hot cathode tubes (HCT) 101–104 as four light sources; four illumination devices including life detection circuits 113–116 for the hot cathode tubes, turn-off circuits 109–112, lighting circuits 105–108, for the respective hot cathode tubes; and a common power supply 117.

A hot cathode tube has a lighting voltage that gradually increases as it approaches its life end. Accordingly, if the life detection circuits 113–116 are used to always monitor the lighting voltages of the hot cathode tubes 101–104, respectively, and supply a life-detection signal to the respective turn-off circuits 109–112 to turn off the tubes 101–104 when the detected lighting voltage exceeds a certain voltage as indicating a life end, it is possible to obviate a filament breakage or an abnormal heating at a tube end in a life end period of the hot cathode tubes 101–104.

For example, if the life detection circuit 113 judges that the hot cathode tube 101 approaches its life end, it supplies a life-detection signal to the turn-off circuit 109, by which the operation of the lighting circuit 105 is terminated to turn off the hot cathode tube 101. As a specific means for life end detection, a voltage between both ends of a hot cathode tube may be lowered by resistance division and rectified to provide an input signal to a comparator, such as a comparator IC. The hot cathode tube may be continually energized until the input signal exceeds a prescribed threshold, and, when the threshold is exceeded, the energization of the tube may be terminated.

In this embodiment, the plurality of hot cathode tubes constituting an illumination device are respectively provided with a life detection circuit and a lighting circuit which is controlled independently from the other, and each hot cathode tube is monitored with respect to a lighting voltage applied between both ends thereof. Thus, the illumination device has a number of independent lighting circuits equal to that of the tubes therein, so that only a tube approaching its life end is turned off and the other normal tubes are continued to be energized. As a result, it becomes possible to obviate a difficulty to an operator that the display picture (screen) is suddenly turned into dark to disable the operator from continuing its operation.

[Second embodiment]

The above First embodiment has a difficulty in that an illumination device including more than two tubes requires a large number of illumination circuits for turning on and off each tube, thus becoming expensive. For this reason, in this embodiment, two or more tubes are combined in a block to be turned off simultaneously.

FIG. 4 shows an illumination device according to this embodiment including four hot cathode tubes. Life detection circuits 211–214 are disposed for hot cathode tube 201–204, respectively, and lighting circuits 205 and 206 are provided not to the respective tubes but to two blocks including two hot cathode tubes 201 and 202 and two hot cathode tubes 203 and 204, respectively, so as to turn on and off each block independently from the other. Further, turn-off circuits 207–210 are disposed for the hot cathode tubes 201–204, respectively, similarly as in the previous embodiment, for receiving life-detection signals from the life detection circuits 211–214, respectively, to stop the operation of the lighting circuits 205 and 206.

In this embodiment, when a hot cathode tube 01 for example is judged to approach its life end, life detection circuit 211 issues a life detection signal to a turn-off circuit 207, which terminates the operation of a lighting circuit 205 on receipt of the life detection signal to turn off the hot cathode tubes 201 and 202 simultaneously.

At this time, a lighting circuit 206 is independent from the turn-off circuit 207, so that the hot cathode tubes 203 an 204 are continually energized. According to this embodiment, it is possible to obviate simultaneous turning-off of all the tubes when one tube approaches its life end while using a simpler circuit structure, i.e., a lower cost one, than in the above First embodiment.

[Third embodiment]

Figure 5:
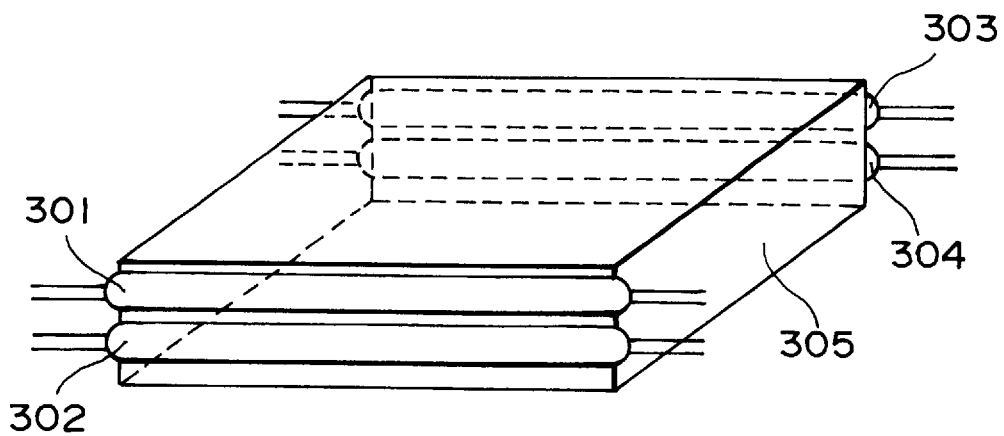
FIGS. 5 and 6 are respectively a schematic perspective view of an edge light-type backlight unit.

This embodiment is directed to an illumination device comprising a combination of a backlight unit (illumination device unit) having four tubes (lamps) including two tubes on each of two opposing sides as shown in FIG. 5 and an illumination circuit as shown in FIG. 4.

Referring to FIG. 5, the backlight unit includes hot cathode tubes 301–304 and a light-guide member 305. Other accessories, such as lamp reflectors, a reflection plate on the back (lower) side of the light guide member and a diffusion sheet on the upper side of the light guide member, are omitted from showing. In this arrangement of tubes, mutually oppositely disposed tubes 301 and 303 and tubes 302 and 304, as shown in FIG. 5, are combined to form two blocks of tubes, which are subjected to life-detection control independently from each other. For example, when a tube 301 approaches its life end, only two tubes 301 and 303 disposed opposite to each other forming a block or pair are turned off simultaneously, and the other two tubes are continued to be energized.

Arbitrary selection of two tubes in respective blocks may be possible. However, if the combination of this embodiment is selected, two lamps including one on each side are continued to be energized after turning off two tubes, without remarkably impairing the luminance distribution on the illumination device. Thus, the operator of the display apparatus can obviate an unpleasant feeling after turning-off due to the life end of one tube.

As a result, the number of lighting circuits is reduced from four to two, thus providing a reduction in production cost.

[Fourth embodiment]

Figure 6:
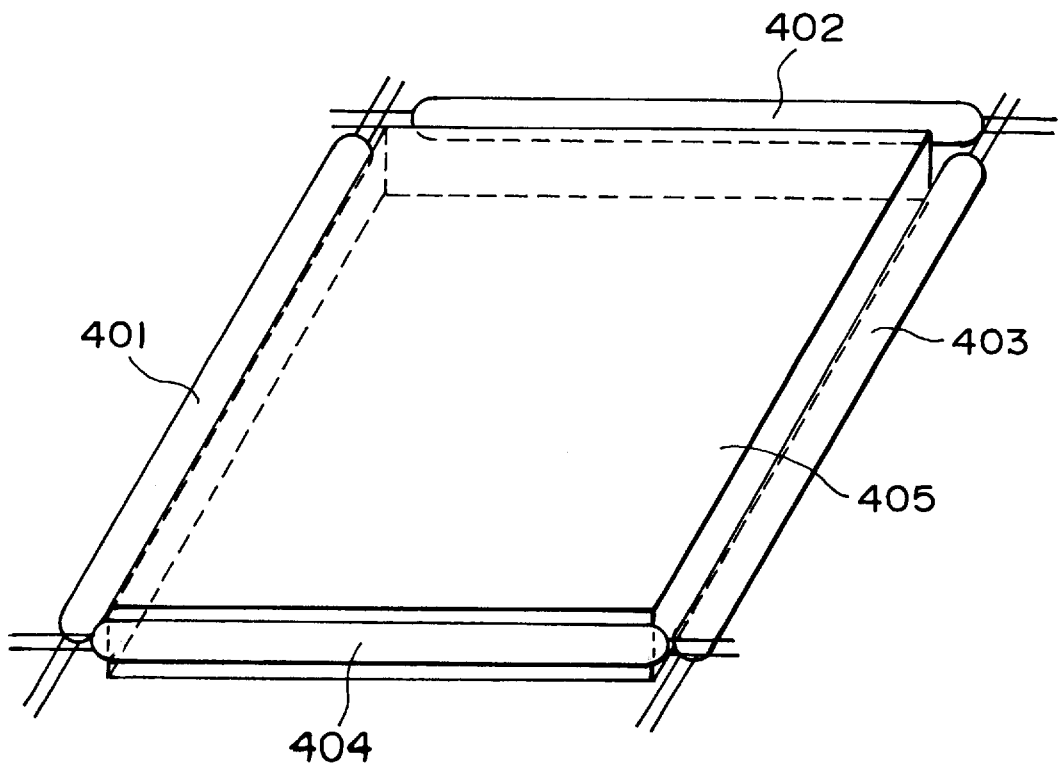

This embodiment is directed to an illumination device comprising a combination of a backlight unit having light sources disposed as shown in FIG. 6 and an illumination circuit as shown in FIG. 4.

The backlight unit shown in FIG. 6 includes four tubes 401–404 disposed along four sides of a light-guide member 405 of, e.g., an acrylic plate. By combining oppositely disposed tubes 401 and 403, and tubes 402 and 404 in pairs, a better luminance distribution can be attained after turning off a pair of tubes than in the case of using pairs of tubes 401 and 402 and tubes 403 and 404.

[Fifth embodiment]

Figure 7:
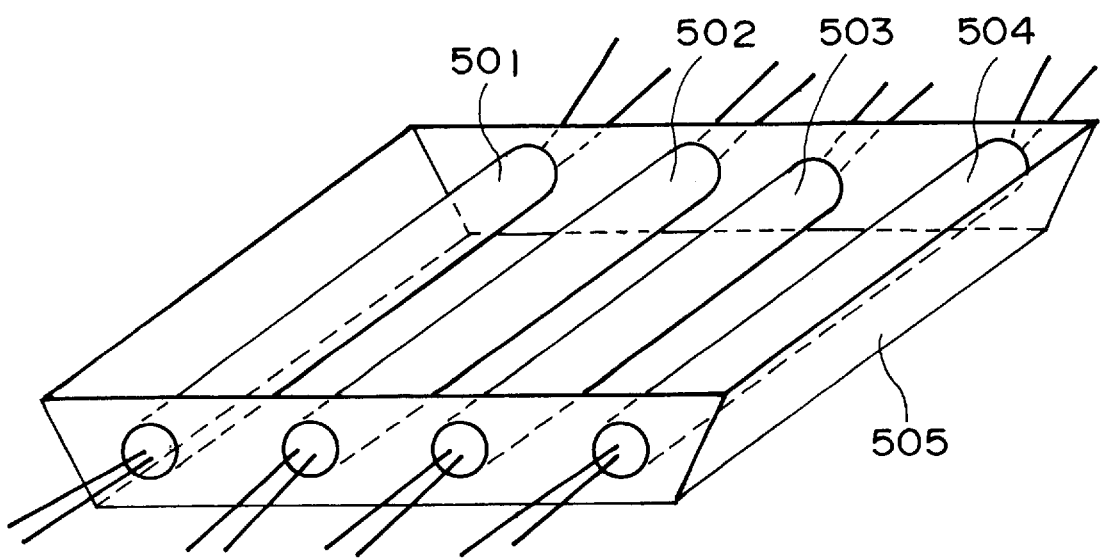
FIG. 7 is a schematic perspective view of a direct-backing-type backlight unit.

This embodiment is directed to a combination of an illumination circuit as shown in FIG. 4 and a backlight unit as shown in FIG. 7.

FIG. 7 shows a backlight unit of a direct-backing type including four hot cathode tubes 501–504 and a reflection frame 505. Other members, such as a diffusion plate, are omitted from showing. By combining tubes 501 and 504 and tubes 502 and 503 oppositely disposed in pairs, or by combining tubes 501 and 503 and tubes 502 and 504 alternately disposed in pairs, similar effects as described above may be achieved.

Of course, it is possible to combine the illumination circuit of FIG. 3 with of the backlight units shown in FIGS. 5–7.

Similar effects may be achieved by appropriate combination of tubes also in illumination devices including 6 or 8 tubes.

As a tube life detection means, it is possible to use a temperature-detection element, such as a thermistor, in addition to a means for monitoring a lighting voltage of a tube as described above. In the case of using a temperature-detection element, a temperature rise at a tube end occurring at a life end of the tube may be monitored and the operation of a lighting circuit may be terminated at a temperature exceeding a certain reference temperature similarly as in the above-mentioned tube voltage detection scheme. Similar control scheme may also be used regarding the manner of turning off the tubes, inclusive of the combination of plural tubes in a pair to be turned off simultaneously.

Figure 8:
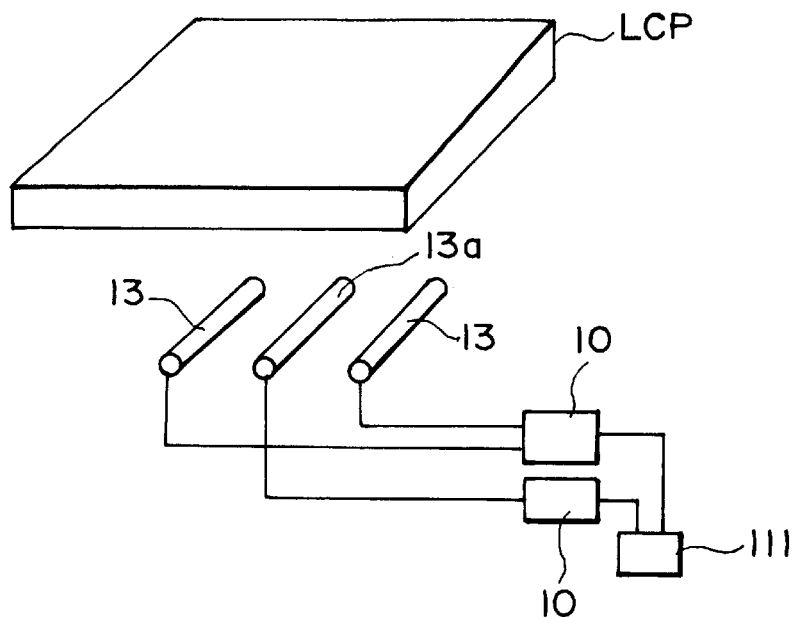
FIGS. 8 and 9 are respectively a schematic system illustration of a liquid crystal display apparatus showing positions of light sources and a control circuit thereof.

FIG. 8 shows an illumination device including a backlight unit of a direct-backing type including three light sources 13 and 13a. In case where the central light source 13a approaches its life end, only the light source 13a is turned off and, in case where either one of the light sources 13 on sides approaches its life end, both the light sources 13 are simultaneously turned off.

Figure 9:
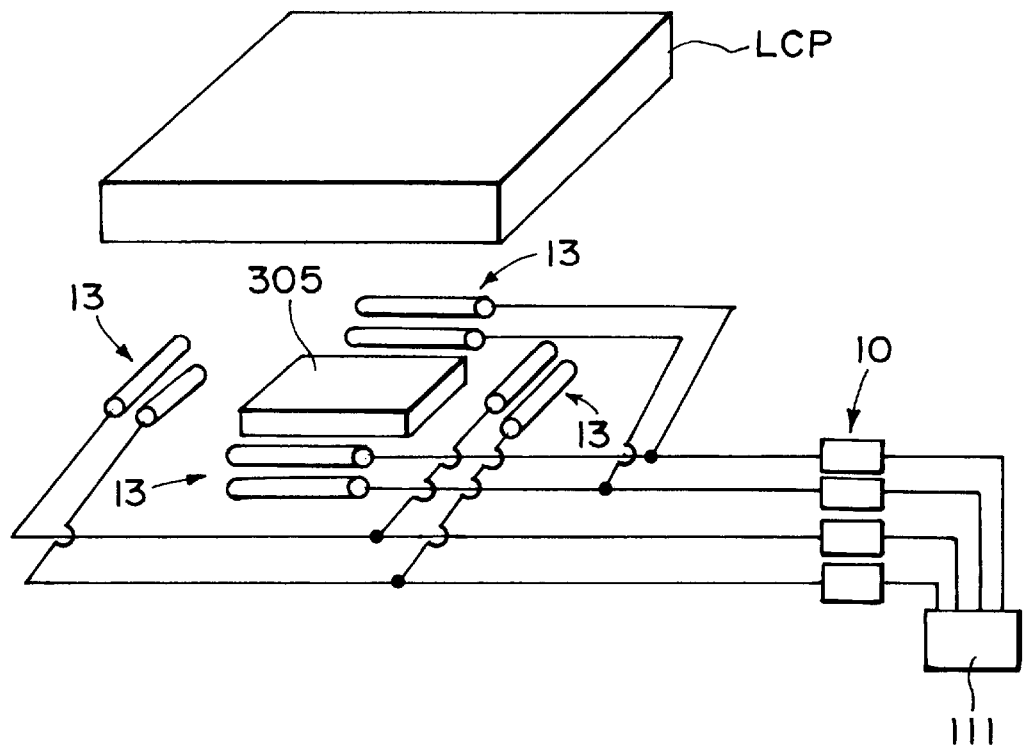

FIG. 9 shows an illumination device including a backlight unit of an edge light-type including 8 light sources, among which a pair of oppositely disposed two light sources is turned on and off simultaneously.

By using a liquid crystal display apparatus equipped with each illumination device as described above on its back side, it is possible to continue its operation even after the extinguishment of the illumination device as the extinguishment is effected not entirely over the illumination device but partially, so that it is not necessary to pay serious attention to the life of component tubes.

It is also desirable to incorporate an operation mode or a control scheme such that, in case where a display image is not changed for a certain period, a power supply to the lighting circuits is terminated to turn off all the light sources. Such an operation mode is effective for economization of power consumption. The presence or absence of display image change may be judged by monitoring the rewriting state of a VRAM storing display image data. When VRAM data is rewritten by mouse input or keyboard input, the light sources may be turned on again except for those in a block containing a light source having reached its life end.

The invention may be embodied in other specific forms without departing from the spirit or essential characteristics thereof. The above-described embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

As described above, according to the present invention, an illumination device including plural hot cathode tubes for a liquid crystal display apparatus is provided, such that the operation of a light circuit is terminated when a life end of a tube is detected to be approached so as not to turn off all the tubes constituting the illumination device, whereby an operator of the liquid crystal display apparatus can obviate a difficulty that the display picture suddenly becomes impossible to see.

What is claimed is:

1. An illumination device for a liquid crystal display apparatus to be disposed on a back side of a liquid crystal display panel, comprising:

plural hot cathode tubes divided into at least two sub-groups each including a pair of said hot cathode tubes disposed at mutually symmetrical positions with respect to the liquid crystal display panel, and a plurality of illumination circuits, where at least one of said illumination circuits is associated with a respective one of each of said sub-groups of hot cathode tubes, each illumination circuit including a life detection circuit for detecting life end of an associated hot cathode tube, and a turn-off circuit for turning off the associated hot cathode tube depending on an output of the life detection circuit, said plurality of illumination circuits being so arranged that, when the life end of one of the hot cathode tubes of one of the pairs is detected, said one hot cathode tube and the other hot cathode tube of the one pair are simultaneously turned off while the remainder of the hot cathode tubes are kept on.

2. An illumination device according to claim 1, wherein each illumination circuit detects a life end of the associated hot cathode tube to terminate a power supply to the associated hot cathode tube for which the life end has been detected and to the other hot cathode tube forming a pair with the associated hot cathode tube.

3. An illumination device according to claim 1, wherein said life detection circuit includes a voltage detection circuit for detecting a lighting voltage to the associated hot cathode tube and a comparison circuit for comparing an output voltage from the voltage detection circuit with a reference voltage.

4. An illumination device according to claim 1, wherein said life detection circuit includes a temperature sensor for detecting a temperature of the associated hot cathode tube, a voltage conversion circuit for converting an output of the temperature sensor to an output voltage, and a comparison circuit for comparing the output voltage with a reference voltage.

5. An illumination device according to claim 1, wherein said plural hot cathode tubes are disposed along edges of a light guide member disposed on the back side of the liquid crystal display panel.

6. An illumination device according to claim 5, wherein said sub-group of hot cathode tubes to be turned off simultaneously includes two hot cathode tubes which are disposed on mutually opposite edges of the light guide member.

7. An illumination device according to claim 5, wherein said sub-group of hot cathode tubes to be turned off simultaneously includes one hot cathode tube selected from hot cathode tubes disposed on mutually opposite edges of the light guide member.

8. An illumination device according to claim 1 wherein all the hot cathode tubes are controlled to be turned off when a display image on the liquid crystal display panel is not changed for a period exceeding a prescribed period.

9. An illumination device according to claim 1, wherein all the illumination circuits are supplied with a signal for turning off the hot cathode tubes when a display image on the liquid crystal display panel is not changed for a period exceeding a prescribed period.

10. An illumination device according to claim 1, wherein said liquid crystal display panel comprises a pair of substrates and a smectic liquid crystal disposed between the substrates.

11. An illumination device according to claim 1, wherein said liquid crystal display panel comprises a pair of substrates and a nematic liquid crystal disposed between the substrates.

12. An illumination device according to claim 1, wherein said liquid crystal display panel comprises a pair of substrates and a ferroelectric liquid crystal disposed between the substrates.

13. An illumination device according to claim 1, wherein said liquid crystal display panel comprises a pair of substrates and an anti-ferroelectric liquid crystal disposed between the substrates.

14. An illumination device according to claim 1, wherein said liquid crystal display panel comprises a pair of substrates and a chiral nematic liquid crystal disposed between the substrates.

15. An illumination device according to claim 1, wherein said plural hot cathode tubes are arrange in at least one pair of symmetrically disposed hot cathode tubes, and at least one pair of symmetrically disposed hot cathode tubes are turned off simultaneously.

16. A liquid crystal display apparatus, comprising: a liquid crystal display panel, and an illumination device disposed on a back side of the liquid crystal display panel, said illumination device including plural hot cathode tubes divided into at least two sub-groups each including a pair of said hot cathode tubes disposed at mutually symmetrical positions with respect to the liquid crystal display panel, and a plurality of illumination circuits, where at least one of said illumination circuits is associated with a respective one of each of said sub-groups of hot cathode tubes, each illumination circuit including a life detection circuit for detecting life end of an associated hot cathode tube, and a turn-off circuit for turning off the associated hot cathode tube depending on an output of the life detection circuit, said plurality of illumination circuits being so arranged that, when the life end of one of the hot cathode tubes of one of the pairs is detected, said one hot cathode tube and the other hot cathode tube of the one pair are simultaneously turned off while the remainder of the hot cathode tubes are kept on.

17. A display apparatus according to claim 16, wherein said plural hot cathode tubes are disposed along edges of a light guide member disposed on the back side of the liquid crystal display panel.

18. A display apparatus according to claim 17, wherein said sub-group of hot cathode tubes to be turned off simultaneously includes two hot cathode tubes which are disposed on mutually opposite edges of the light guide member.

19. A display apparatus according to claim 17, wherein said sub-group of hot cathode tubes to be turned off simultaneously includes one hot cathode tubes disposed on mutually opposite edges of the light guide member.

* * * * *

UNITED STATES PATENT AND TRADEMARK OFFICE
CERTIFICATE OF CORRECTION

PATENT NO. : 5,808,597
DATED : September 15, 1998
INVENTOR(S) : YOSHIHIRO ONITSUKA ET AL.

Page 1 of 2

It is certified that error appears in the above-identified patent and that said Letters Patent is hereby corrected as shown below:

ON THE COVER PAGE AT [56] U.S. PATENT DOCUMENTS

"Iwamato et al." should read --Iwamoto et al.--.

ON THE COVER PAGE AT [56] FOREIGN PATENT DOCUMENTS

"405002159" should read --5-2159-- and
"406180441" should read --6-180441--.

COLUMN 1

Line 19, "increased" should read --increase--;
Line 33, "or" should read --or to--;
Line 35, "its tubes" should read --the tube's--;
Line 44, "to" should be deleted;
Line 64, "circuit," should read --circuit, and--.

COLUMN 3

Line 24, "of" should read --of a--;
Line 28, "three" should read --three---;
Line 39, "direct-backing type" should read --direct-backing-type--;
Line 44, "to" should read --to the--.

COLUMN 4

Line 42, "01" should read --201--.

UNITED STATES PATENT AND TRADEMARK OFFICE
CERTIFICATE OF CORRECTION

PATENT NO. : 5,808,597
DATED : September 15, 1998
INVENTOR(S) : YOSHIHIRO ONITSUKA ET AL.

It is certified that error appears in the above-identified patent and that said Letters Patent is hereby corrected as shown below:

<u>COLUMN 5</u>

Line 30, "404" should read --404,--;
Line 48, "of" (second occurrence) should be deleted.

<u>COLUMN 6</u>

Line 52, "panel, and" should read --panel; and--.

<u>COLUMN 8</u>

Line 10, "arrange" should read --arranged--;
Line 22, "panel, and" should read --panel; and--.

Signed and Sealed this

Thirteenth Day of July, 1999

Attest:

Q. TODD DICKINSON

Attesting Officer

Acting Commissioner of Patents and Trademarks